United States Patent [19]

Takahashi et al.

[11] Patent Number: 4,900,282
[45] Date of Patent: Feb. 13, 1990

[54] EXHAUST GAS PURIFYING DEVICE FOR MARINE ENGINE

[75] Inventors: Masanori Takahashi; Tatsuki Uchida, both of Hamamatsu, Japan

[73] Assignee: Sanshin Kogyo Kabushiki Kaisha, Hamamatsu, Japan

[21] Appl. No.: 107,932

[22] Filed: Oct. 13, 1987

[30] Foreign Application Priority Data

Oct. 13, 1986 [JP] Japan ................................ 61-242243

[51] Int. Cl.⁴ .............................................. B63H 23/32
[52] U.S. Cl. ......................................... 440/89; 60/302
[58] Field of Search ................. 60/282, 298, 299, 302; 123/41.31; 440/88, 89

[56] References Cited

U.S. PATENT DOCUMENTS

| 3,310,022 | 3/1967 | Kollman | 440/88 X |
| 3,820,327 | 6/1974 | Henault | 60/298 X |
| 4,091,616 | 5/1978 | Loweg | 60/302 X |
| 4,735,046 | 4/1988 | Iwai | 60/298 X |
| 4,772,236 | 9/1988 | Takahashi | 440/89 |

FOREIGN PATENT DOCUMENTS 0019939 2/1980 Japan ..................... 440/89

Primary Examiner—Sherman D. Basinger
Attorney, Agent, or Firm—Ernest A. Beutler

[57] ABSTRACT

A catalytic exhaust system for a marine outboard drive wherein the catalyzer material is supported by a heat conductive bracket and the bracket is cooled by a cooling jacket that is supplied with coolant from the engine cooling jacket. In one embodiment, the water jacket is cooled both internally and externally by delivering water from the cooling jacket into the exhaust system to impinge upon a wall of the cooling jacket.

15 Claims, 4 Drawing Sheets

EXHAUST GAS PURIFYING DEVICE FOR MARINE ENGINE

BACKGROUND OF THE INVENTION

This invention relates to an exhaust gas purifying device for a marine engine and, more particularly, to an improved catalytic gas exhaust treatment arrangement for such an engine.

It is well known that exhaust gases from an internal combustion engine may be treated by a system that includes a catalyst that will cause a chemical reaction to occur that renders certain of the exhaust gas constituents harmless. In connection with such arrangements, it is conventional to position the catalyst in such a manner that it is contained within the exhaust system or an exhaust passage of the engine. Such placement is desirable to ensure treatment of the exhaust gases. However, the support of the catalyst bed in such a location presents numerous problems. One of these problems has to do with the actual heat which the supporting element must encounter in such an arrangement. Not only are the exhaust gases hot, but the catalyst must operate at an elevated temperature in order to achieve the desired reaction. As a result, the thermal stresses on the supporting arrangement for the catalyst bed can cause either looseness and leakage or, alternatively, can put compressive forces on the catalyst and catalyst bed that can cause damage to it.

It is, therefore, a principal object of this invention to provide an improved arrangement for treating the exhaust gases in an internal combustion engine with a catalyzer.

It is a further object of this invention to provide an arrangement for cooling the supporting arrangement for the catalyzer bed of an internal combustion engine exhaust treatment system.

The treatment of the exhaust gases from an internal combustion engine is particularly important with outboard motors. As is well known, such outboard motors normally discharge their exhaust gases into the atmosphere back through the body of water in which the outboard motor is operating. As such, it is particularly important to remove from the exhaust gases materials which would pollute the water in which the watercraft is operating.

In the copending applications entitled "Oil Remover For Exhaust Gas of Marine Propulsion Unit", Ser. No. 871,516, Filed June 6, 1986 in the name of Tomio Iwai, now U.S. Pat. No. 4,735,046, issued Apr. 5, 1988 and entitled "Exhaust Gas Purifying Device For Marine Engine", Ser. No. 5,603, filed Jan. 21, 1987, in the name of Masanori Takahashi now U.S. Pat. No. 4,772,236, issued Sept. 20 1988, both of which are assigned to the assignee of this application, there are disclosed very effective arrangements for treating the exhaust gases of an outboard motor. In connection with certain embodiments shown in these applications, there is a catalyst bed that is supported within an opening of the engine which is in proximity to the exhaust ports for treatment of the exhaust gases. In accordance with such an arrangement, it is particularly advantageous if the mounting arrangement for the catalyst can be effectively cooled.

It is, therefore, a still further object of this invention to provide an improved arrangement for cooling the catalyst mounting arrangement in such an arrangement.

SUMMARY OF THE INVENTION

A first feature of this invention is adapted to be embodied in a catalytic exhaust treatment system for an internal combustion engine comprising an exhaust passage for receiving exhaust gases. A catalyst is supported within the exhaust passage and is positioned to be contacted by the exhaust gases in the exhaust passage. The catalyst is supported by a supporting member formed from a heat conductive material and a cooling jacket is provided in heat exchanging relationship with the supporting member.

Another feature of the invention is adapted to be embodied in a catalytic exhaust treatment system for a water-cooled internal combustion engine that comprises an exhaust passage for receiving exhaust gases. A catalyst is supported within the exhaust passage and in a position to be contacted by the exhaust gases in the exhaust passage. A cooling jacket containing engine coolant is in heat-exchanging relationship with the catalyst and means are provided for delivering coolant from the cooling jacket into the exhaust passage in proximity with the catalyst.

DETAILED DESCRIPTION OF THE PREFERRED EMBODIMENT

Figure 1:
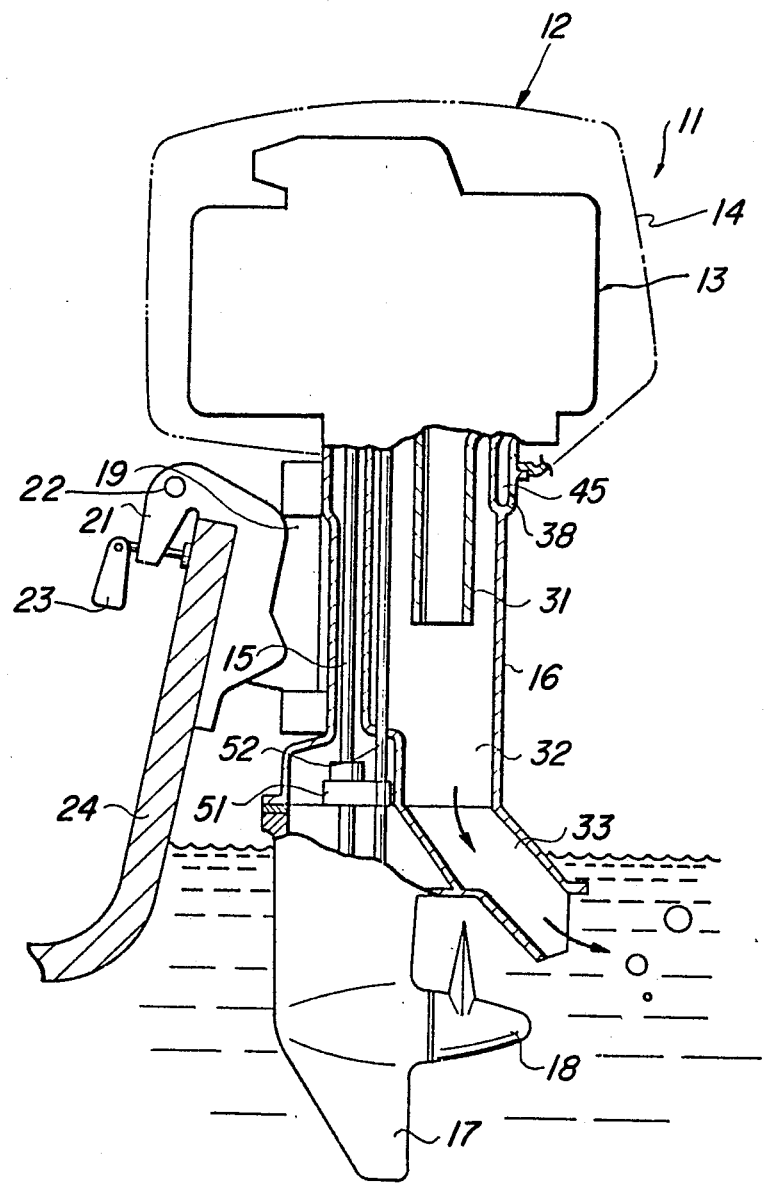
FIG. 1 is a side-elevational view of an outboard motor, with a portion broken away, that typifies the environment in which the invention may be employed.

Referring first to FIG. 1, an outboard motor constructed in accordance with an embodiment of the invention is identified generally by the reference numeral 11. The outboard motor 11 is comprised of a powerhead assembly, indicated generally by the reference numeral 12 and which includes an internal combustion engine 13 that is surrounded by a protective cowling, which is shown in phantom in FIG. 1 and is identified by the reference numeral 14. The engine 13, in the illustrated embodiments, is of the two-cycle crankcase compression type. As will become apparent, the illustrated embodiment incorporates an engine 13 which is of the in-line two-cylinder type. It is to be understood, however, that the invention can be used in conjunction with engines having other cylinder configurations and operating on other principles.

As noted, the engine 13 is of the two-cylinder in-line type and in accordance with normal outboard motor practice, it has its output shaft rotating about a vertically extending axis. The output shaft of the engine is coupled to a vertically extending driveshaft 15 which is journaled within a driveshaft housing 16 that depends from the powerhead 12. At the lower end of the driveshaft housing 16 there is provided a lower unit 17 in which a forward-neutral-reverse transmission (not shown) is incorporated for selectively driving a propeller 18 in a forward or reverse direction.

The driveshaft housing 16 has affixed to it a steering shaft (not shown) that is journaled for steering movement in a swivel bracket 19 in a known manner. The swivel bracket 19 is, in turn, pivotally connected to a clamping bracket 21 by means of a pivot pin 22 for tilting and trim movement of the outboard motor 11. The clamping bracket 21 includes a clamping device 23 for clamping the outboard motor assembly 11 to a transom of a watercraft 24.

Figure 2:
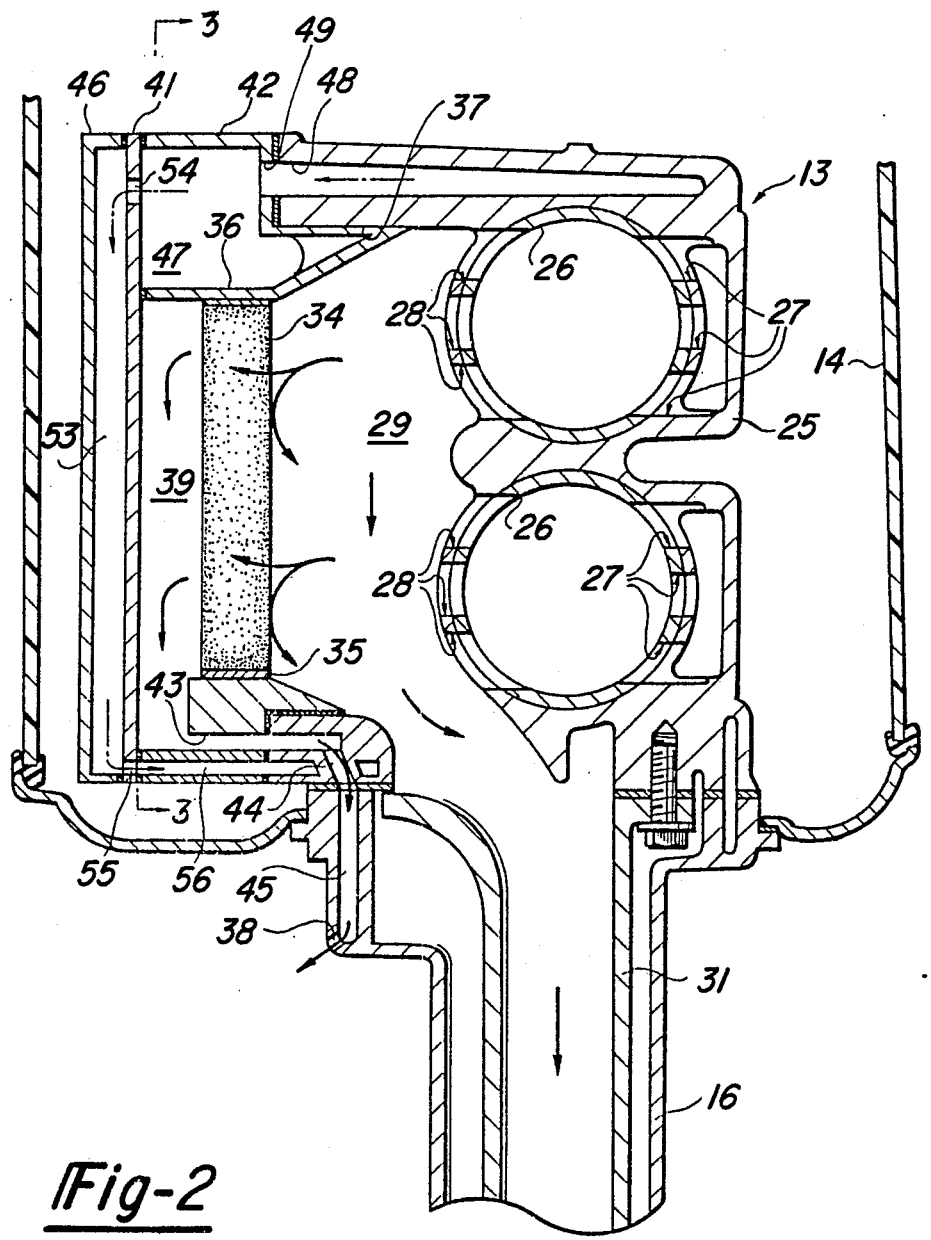
FIG. 2 is an enlarged cross-sectional view showing a portion of the motor constructed in accordance with a first embodiment of the invention.
Figure 3:
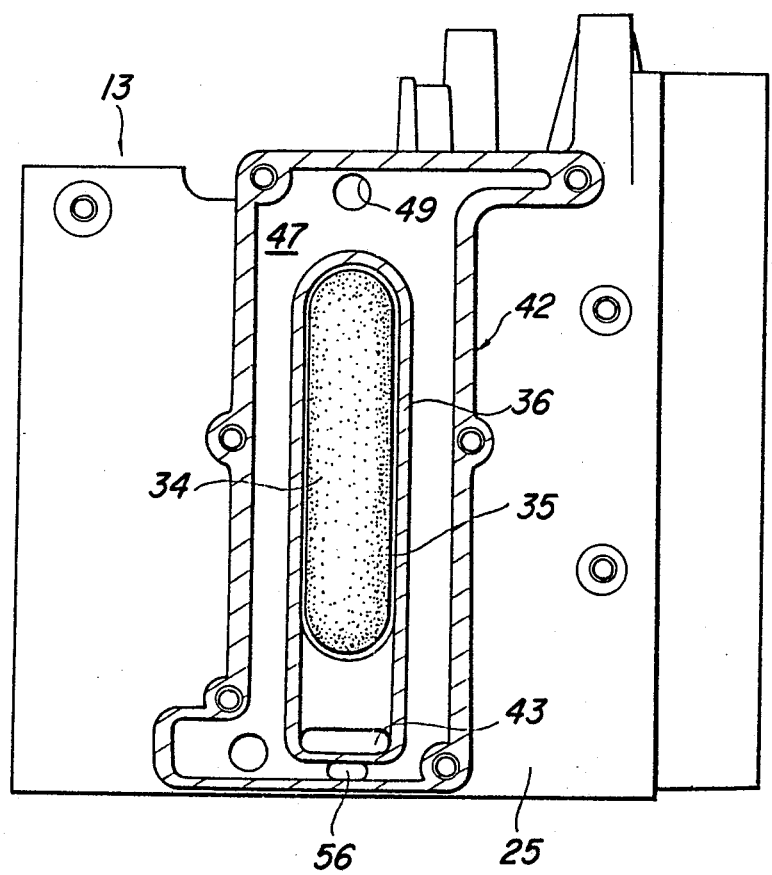
FIG. 3 is a cross-sectional view taken along the line 3—3 of FIG. 2.

Referring now additionally to FIGS. 2 and 3, the engine 13, as has been noted, is of the two-cylinder, two-cycle crankcase compression type. The engine 13 includes a cylinder block 25 in which a pair of vertically disposed horizontally oriented cylinder liners 26 are supported. The cylinder liners 26 carry pistons that are connected by means of connecting rods to the crankshaft of the engine for driving it. Since the invention relates to the exhaust system for the engine and since the specific constructional details of the engine, except for the exhaust system, form no part of the invention, these components have not been illustrated and description of them is believed unnecessary in order to understand the invention.

The cylinder liners 26 and cylinder block 25 are provided with intake or scavenge ports 27 through which a charge is delivered from the crankcase chambers (not shown) to the combustion chambers. These scavenge passages lie at one side of the cylinder liners. On the opposite side, there are formed exhaust ports 28 which exhaust the exhaust gases from the cylinders into an exhaust manifold or chamber 29 that is formed at one side of the cylinder block 25. These exhaust gases may flow downwardly from the chamber 29 into an exhaust pipe 31 which is affixed between the cylinder block 25 and the driveshaft housing 16 and which depends into the driveshaft housing 16.

As seen in FIG. 1, the lower end of the exhaust pipe 31 communicates with an expansion chamber 32 that is formed within the driveshaft housing 16 for silencing the exhaust gases. The exhaust gases are then discharged to the atmosphere through a high-speed, underwater exhaust gas discharge 33 of a known type.

As is well known, the exhaust gases issuing from the ports 28 contain certain constituents which might be harmful to the atmosphere. Among these constituents are certain gases and also a quantity of lubricating oil, bearing in mind the fact that the engine 13 is of the two-cycle crankcase compression type. In order to treat these harmful exhaust gas constituents, there is provided a catalyzer bed 34 that is disposed in proximity and in facing relationship to the exhaust ports 28. The catalyzer bed 34 comprises a surrounding housing which is porous in nature and in which a catalyzer of an appropriate type is contained. This bed is supported by means of a surrounding catalyzer mat 35 which is, in turn, supported by a supporting bracket 36 that at least partially encircles the mat 35 and catalyst bed 34. The supporting bracket 36 is positioned within an opening 37 that is formed in one side of the cylinder block 25 in confronting relationship, as aforenoted, to the exhaust port 28. Under high-speed operation, the exhaust gases issuing from the exhaust ports 28 will impinge upon the bed 34 and be treated by the catalyst and then discharged downwardly through the exhaust pipe 31 through the high-speed exhaust system aforedescribed.

As is well known in outboard motor practice, under high-speed running, the watercraft 24 will be in a planing position and the underwater discharge 33 will be relatively shallowly submerged. This coupled with the high pressure of the exhaust gases due to the high engine speed makes the underwater gas discharge practical. However, when the watercraft is being operated at a low speed and is not in a planing position, the underwater discharge 33 will be relatively deeply submerged. At the same time, the pressure of the exhaust gases will be relatively low and the underwater exhaust gas discharge would produce too high a flow restriction.

There is, therefore, provided an above-the-water exhaust gas discharge 38 through which exhaust gases are discharged to the atmosphere above the water level under low-speed running. The exhaust gases are delivered to the above-the-water exhaust gas discharge 38 by flowing through the catalyst bed 34 into an expansion chamber 39 that is disposed on the side of the catalyst bed 34 facing away from the exhaust ports 28. This chamber is closed by a first closure plate 41 which is affixed to the cylinder block 25 by means of threaded fasteners (not shown). These threaded fasteners also assist in holding the supporting bracket 36 in position. To this end, the supporting bracket 36 is provided with a cover plate part 42 which is interposed between the closure plate 41 and the face of the cylinder block 25. Suitable gaskets are in position between these members for sealing.

The exhaust gases flow downwardly from the expansion chamber 39 through a generally horizontally disposed exhaust gas passage 43 to a downwardly extending gas passage 44 that is formed in the cylinder block 25. The passage 44 communicates with a further expansion chamber 45 from which the above-the-water gas discharge 38 emanates. Therefore, it should be seen that the exhaust gases will be treated by the catalyzer 34 regardless of which of the gas discharge is effective to discharge the exhaust gases to the atmosphere. It should be noted that an outer cover plate 46 is affixed to the closure plate 41 and supporting bracket 42 via the bolts that hold these assemblies to the block 25.

As should be readily apparent, the exhaust gases impinging on the catalyst bed 34 will cause it to be heated to a relatively high temperature. In addition, the temperature at which the catalyst itself is operative is a high temperature and, accordingly, the catalyzer bed also reaches a very high temperature. This temperature can distort the supporting bracket 36 and cause leakage, damage to the catalyzer bed 34 and various other difficulties, unless compensated for. In accordance with a feature of the invention, there is provided a cooling jacket 47 that is formed by the support bracket 36 and by the closure plate 41. The cooling jacket 47 receives engine coolant from a cylinder block cooling jacket 48 through a passageway 49.

The engine 13 is watercooled and this cooling water is delivered from the body of water in which the watercraft is operating through an inlet opening (not shown) formed in the lower unit 17. A driveshaft driven water pump 51 (FIG. 1) delivers water to the engine cooling jacket 48 through a vertically extending delivery pipe 52. It should be noted that the cooling jacket 47 substantially encircles the supporting bracket 36 and thus will effectively cool the bracket and prevent the delitorious effects of thermal expansions, aforenoted.

To further assist in cooling, an additional cooling jacket 53 is formed between the closure plate 41 and cover plate 46. Coolant from the jacket 57 is delivered to the jacket 53 through a delivery passage 54 that is formed in the closure plate 41. This coolant is, then, delivered back through a pair of return passages 55 and 56 for discharge back into the body of water in which the watercraft is operating through a suitable discharge passage.

Figure 4:
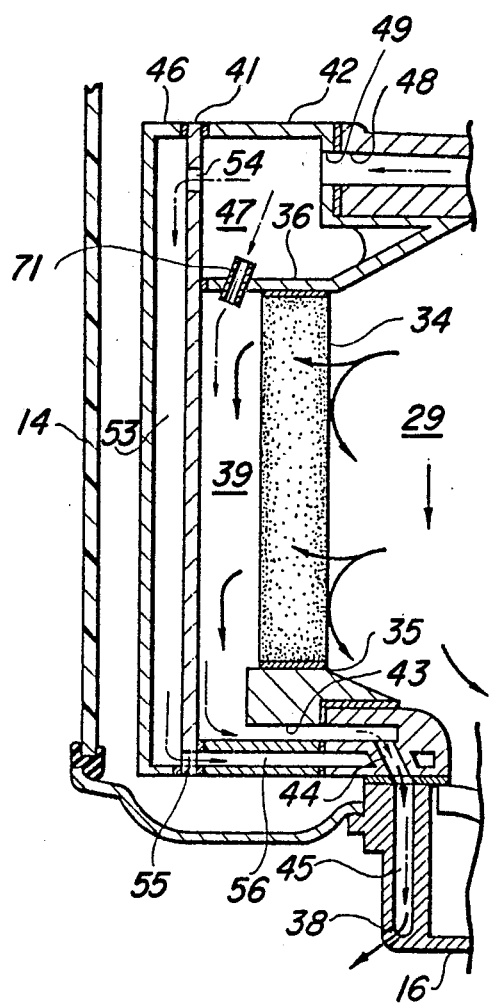
FIG. 4 is a partial cross-sectional view, in part similar to FIG. 2, showing another embodiment of the invention.

Although the embodiment already described is extremely effective in providing good cooling for the catalyzer supporting bracket, FIG. 4 shows another embodiment which provides additional cooling effect. This embodiment is substantially the same as the embodiment of FIGS. 2 and 3 and for that reason those components which are the same as the previously described embodiment have been identified by the same reference numerals and will not be described again.

In this embodiment, a small water delivery pipe 71 extends through the supporting bracket 36 from the cooling jacket 47 to the expansion chamber 39. The delivery pipe 71 is disposed at an angle so as the cooling water flowing through it will impinge upon the wall of the closure plate 41 facing the catalyzer bed 34 so as to provide additional cooling. This water will be discharged through the above-the-water exhaust gas discharge including the passageway 35, port 44, expansion chamber 45 and the above-the-water exhaust gas discharge 38. Thus, the additional cooling water will be easily discharged back to the body of water in which the watercraft is operating.

It should be readily apparent from the foregoing description that the embodiments of the invention illustrated and described are extremely effective in ensuring that the catalyzer bed support will be adequately cooled so that there will be no thermal expansion problems that can adversely affect sealing or which might damage the catalyzer bed. The foregoing description, as should be readily apparent, is that of only two preferred embodiments of the invention and various changes and modifications can be made without departing from the spirit and scope of the invention, as defined by the appended claims.

We claim:

1. A catalytic exhaust treatment system for a liquid cooled internal combustion engine having a cooling jacket comprising an exhaust passage formed at least in part within the body of said engine for receiving exhaust gases, a catalyzer supported within the portion of said exhaust passage formed in the body of said engine and at a position to be contracted by the exhaust gases in said exhaust passage, said catalyzer being supported by a support member formed from a heat conductive material in direct heat engaging relation with the part of the engine body defining the exhaust passage portion, said cooling jacket being in heat-exchanging relationship with said support member and means for discharging coolant from said cooling jacket directly into said exhaust passage in proximity to said catalyzer for mixing with the exhaust gases in said exhaust passage.

2. A catalytic exhaust treatment system as set forth in claim 1 wherein the engine forms the power unit of a marine drive and the coolant for the engine cooling system and the cooling jacket is drawn from the body of water in which the engine is operating.

3. A catalytic exhaust treatment system as set forth in claim 1 wherein the engine is a two-cycle crankcase compression internal combustion engine and the catalyzer is supported within an opening formed in the engine which faces the exhaust port of the engine.

4. A catalytic exhaust treatment system as set forth in claim 3 wherein the engine forms the power unit of a marine drive and the coolant for the engine cooling system and the cooling jacket is drawn from the body of water in which the engine is operating.

5. A catalytic exhaust treatment system as set forth in claim 3 wherein the opening in the engine is closed by a closure plate disposed on the side of the catalyst opposite to the side facing the exhaust port.

6. A catalytic exhaust treatment system as set forth in claim 5 wherein the closure plate forms a portion of the cooling jacket.

7. A catalytic exhaust treatment system as set forth in claim 6 wherein the means for delivering a portion of the coolant from the cooling jacket into the exhaust system directs the coolant toward contact with the closure plate.

8. A catalytic exhaust treatment system as set forth in claim 1 wherein the portion of the exhaust passage formed in the engine body includes an opening in the engine body that receives the catalyst in facing relation to the flow of exhaust gases, said opening being closed by a closure plate disposed on the side of the catalyst opposite to the side facing the exhaust gas flow.

9. A catalytic exhaust treatment system as set forth in claim 8 wherein the closure plate forms a portion of the cooling jacket.

10. A catalytic exhaust treatment system as set forth in claim 9 wherein the means for delivering a portion of the coolant from the cooling jacket into the exhaust system directs the coolant toward contact with the closure plate.

11. A catalytic exhaust treatment system for a water-cooled internal combustion engine comprising an exhaust passage formed within said engine for receiving exhaust gases, a catalyzer supported within said exhaust passage and in a position to be contacted by the exhaust gases in said exhaust passage, a cooling jacket containing engine coolant and in a heat-exchanging relationship with said catalyzer, and means for delivering engine coolant from said cooling jacket directly into said exhaust passage in proximity with said catalyzer and for mixing with said exhaust gases.

12. A catalytic exhaust treatment system as set forth in claim 11 wherein the engine forms the power unit of a marine drive and the coolant for the engine cooling system and the cooling jacket is drawn from the body of water in which the engine is operating.

13. A catalytic exhaust treatment system as set forth in claim 11 wherein the engine comprises a two-cycle crankcase compression internal combustion engine and the catalyzer is supported within an opening formed in the engine and which opening faces the exhaust ports of the engine.

14. A catalytic exhaust treatment system as set forth in claim 13 wherein the opening in the engine is closed by a closure plate disposed on the side of the catalyst opposite to the side facing the exhaust ports.

15. A catalytic exhaust treatment system as set forth in claim 14 wherein the closure plate forms a portion of the cooling jacket.

* * * * *